March 1, 1966     P. G. SALERNO ETAL     3,237,862
IN-LINE TEMPERATURE ACTUATED VALVE
Filed Jan. 30, 1964     2 Sheets-Sheet 1
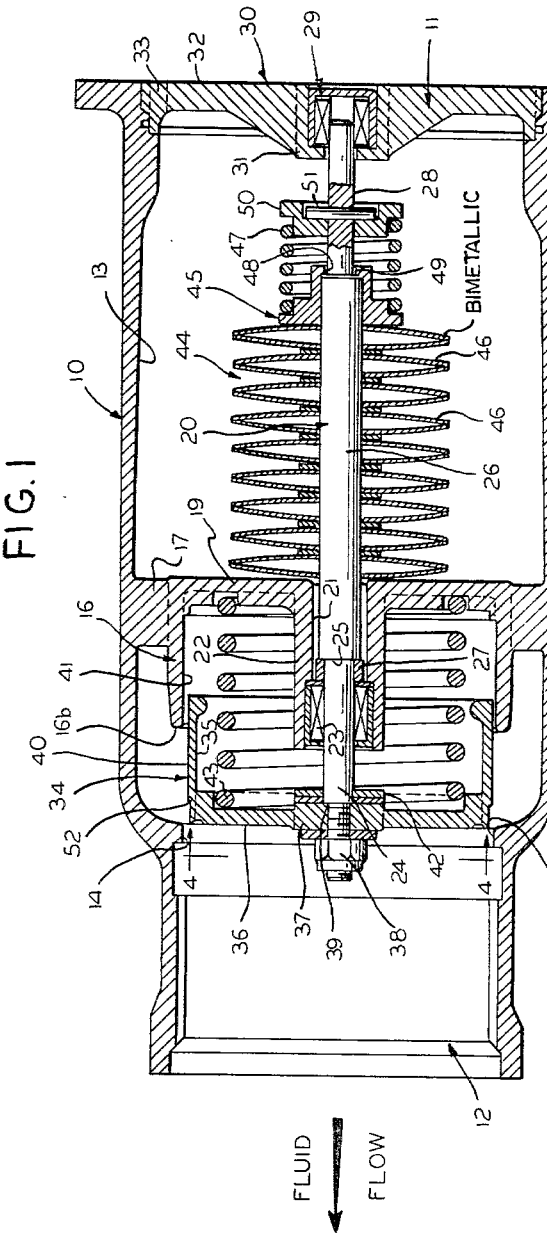
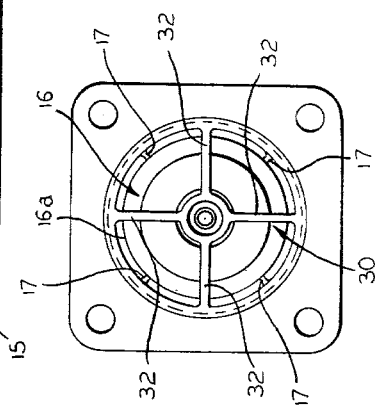
INVENTORS
PAUL G. SALERNO
ROBERT P. SMITH
WILLIAM W. PARKS
MALCOLM A. SIMÉ
VIJAY K. TAPOO
BY
ATTORNEY March 1, 1966 P. G. SALERNO ETAL 3,237,862
IN-LINE TEMPERATURE ACTUATED VALVE
Filed Jan. 30, 1964 2 Sheets-Sheet 2
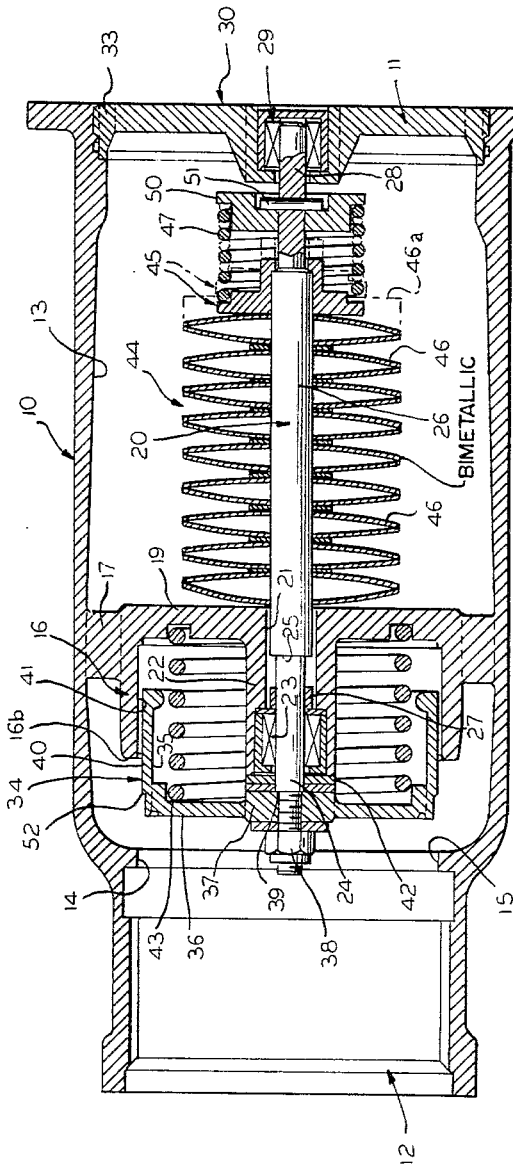
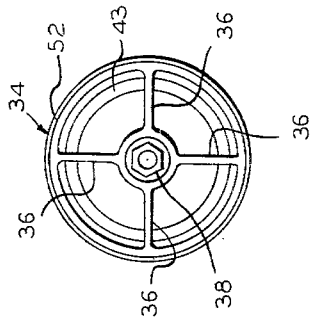
INVENTORS
PAUL G. SALERNO
ROBERT P. SMITH
WILLIAM W. PARKS
MALCOLM A. SIME
VIJAY K. ZADOO
BY Norman A. Witt
ATTORNEY United States Patent Office 3,237,862
Patented Mar. 1, 1966

3,237,862
IN-LINE TEMPERATURE ACTUATED VALVE
Paul G. Salerno, Glenview, Robert P. Smith, Lincolnwood, William W. Parks, Glenview, Malcolm A. Sime, Des Plaines, and Vijay K. Zadoo, Chicago, Ill., assignors to Vapor Corporation, Chicago, Ill., a corporation of Delaware
Filed Jan. 30, 1964, Ser. No. 341,320
12 Claims. (Cl. 236—93)

This invention relates in general to a temperature actuated valve, and more particularly to an in-line valve capable of controlling fluid flow through a line as a direct function of temperature, and still more particularly to an in-line actuated valve for regulating the flow of a gas, and specifically air, as a function of the temperature of the gas.

The valve of the present invention is primarily useful for delivering a predetermined amount of heat capacity wherein the source of heat is derived from air of variable temperature. Accordingly, the valve includes a tubular housing mounted in a line having an internally arranged and actuated fluid flow control member that is movable only in response to temperature of the fluid flowing through the housing by a temperature responsive actuator. The fluid flow control member is aero-dynamically balanced so as to not be movable in response to a pressure variation. Thus, the valve of the present invention will operate under any pressure consistent with structural ability.

Therefore, it is an object of the present invention to provide an improved fluid flow control valve responsive to the temperature of the fluid.

Another object of this invention resides in the provision of a temperature actuated fluid flow control valve that is dependent for operation solely on the function of the temperature of the fluid flowing through the valve.

Still another object of this invention is in the provision of a temperature actuated fluid flow control valve capable of modulating fluid flow to deliver a predetermined amount of heat capacity.

A further object of this invention is to provide a temperature actuated fluid flow control valve adapted to be installed in a fluid flow line, and having an in-line flow control member and temperature actuator, and being of minimum size and weight.

A still further object of this invention is to provide a temperature actuated fluid flow control valve having an in-line flow control member and temperature actuator, and wherein the flow control member is provided with means for aerodynamically balancing same thereby preventing movement of the member in response to pressure variation.

Another object of this invention is in the provision of an in line valve for regulating the flow of a gas, such as air, as a function of the temperature of the gas.

Still another object of this invention is to provide a fluid flow control valve responsive only to the temperature of the fluid flowing therethrough which includes a temperature responsive actuator and means for permitting overtravel thereof upon being subjected to an extreme temperature.

Other objects, features and advantages of the invention will be apparent from the following detailed disclosure, taken in conjunction with the accompanying sheets of drawings, wherein like reference numerals refer to like parts, in which:

FIG. 1 is an axial sectional view of the valve of the present invention and illustrating the parts in minimum fluid flow position;

FIG. 2 is a view similar to FIG. 1, but showing the parts in maximum fluid flow position, and some parts in phantom to indicate overtravel of the temperature responsive element;

FIG. 3 is an end view of the valve, looking into the inlet end thereof; and

FIG. 4 is an end view of the piston or fluid flow control member, and taken substantially along line 4—4 of FIG. 1.

Referring now to the drawings, and particularly to FIGS. 1 and 2, the valve of the present invention includes an elongated tubular housing 10 having an inlet end 11 and an outlet end 12, wherein fluid flow such as air is always in the direction from the inlet to the outlet. The inlet end is adapted to be connected to a line providing a source of heated air at a variable temperature, while the outlet end is adapted to be connected to a line leading to an area utilizing the heated air. Inasmuch as the area needing the heated air only needs a certain or predetermined heat capacity, means is provided within the housing to regulate the heat capacity flowing through the valve depending upon the temperature of the air.

The housing 10 is provided with a substantially uniform internal diameter as defined by the inner surface 13, and a necked down portion 14 is arranged adjacent the outlet end 12 and defines a diametrically reduced opening 15.

Intermediate the necked down portion 14 and the inlet end 11, a cylindrical member 16 is mounted within the housing 10 and supported thereby by a plurality of webs or spokes 17. The external surface 16a of the cylindrical member 16 is spaced from the internal surface 13 of the housing to essentially thereby define therebetween an annular air passageway 18. Because the annular air passageway 18 is essentially broken up by the webs or spokes 17, it may be defined as a plurality of arcuate passageways.

The cylindrical member 16 is axially aligned in the housing 10 and coaxial with the inlet and outlet, and includes a wall 19 at the upstream end, while the downstream end is open. Further, the downstream end 16b of the cylindrical member 16 is axially spaced from the necked down portion 14.

An axially extending shaft 20 extends through a bore 21 in the wall 19 and further defined by a boss 22. A bearing 23 is mounted in the boss 22 at its downstream end for bearingly receiving a diametrically reduced portion 24 of the shaft 20. A shoulder 25 is defined between the diametrically reduced portion 24 and the main portion 26 of the shaft 20 and which defines the downstream movement limitation of the shaft as it may abut a spacer 27 arranged within the boss 22.

The shaft 20 includes a diametrically reduced portion 28 at its upstream end which is slidably supported in a bearing 29 that is mounted in a shaft support 30. As may be seen, the bearing 29 is carried in a hub portion 31 of the shaft support 30 that has radially extending therefrom a plurality of arms or spokes 32 secured at their outer ends in a ring 33. The entire shaft support 30 is mounted at the inlet end 11 of the housing 10 by any suitable means such as by externally threading the ring 33 and internally threading the inlet end of the housing.

A piston or flow control member 34 is carried on the downstream end of the shaft 20 and coacts with the cylindrical member 16 and the necked down portion 14 to modulate the air flow through the valve. As a piston, the member 34 resembles a sleeve and includes a cylindrical skirt or section 35 supported on the downstream end of the shaft 20 by a plurality of radially extending spokes or arms 36 extending between the downstream end of the skirt 35 and a hub 37 that is carried on and secured to the diametrically reduced portion 24 of the shaft 20 by means of a nut 38. The inner side of the hub 37 abuts against a shoulder 39. Both the external surface 40 of the piston 34 and the opposing internal surface 41 of the cylindrical member 16 are machined to define a minimum clearance fit therebetween. As already indicated, the downstream movement of the piston 34 is limited by the shoulder 25 on the shaft 20 hitting the spacer 27, while the upstream movement of the piston 34 is limited by the spacer 42 hitting the downstream end of the cylindrical member hub 22.

A coil spring 43 is bottomed on one end against the downstream side of the cylindrical member wall 19 and at the other end against the upstream side of the piston supporting arms 36 to normally bias the piston 34 toward the necked down portion 14. The external dimension of the surface 40 is slightly less than the internal dimension of the surface or opening 15. A temperature responsive actuator 44, bottomed at one end against the upstream side of the wall 19 and at the other end against the downstream side of the collar 45, balances the forces of the spring 43 so that no movement of the piston 34 will take place unless the actuator 44 is subjected to a variation in temperature.

The temperature responsive actuator 44, in this instance, comprises a plurality of dish-shaped bimetallic discs 46 having holes in their bottoms to fit over the shaft 20. These discs respond to temperature by flattening when subjected to a higher temperature to thereby reduce the height of the stack of discs and permit the piston 34 to move toward the necked down portion 14. Conversely, when the temperature of the air flowing over the discs decreases, the discs move back toward their original dish-shape to increase the height of the stack of discs and move the piston 34 toward the inlet end 11 of the valve.

To prevent damage to the valve when subjected to excessive or extreme lower temperature, overtravel of the stack of discs 44 is permitted by movement of the collar or retainer 45 along the shaft 20 against the forces of an overtravel spring 47. The spring 47 is bottomed at one end against the collar 45 which is movable along the shaft 20 but limited in movement toward the downstream end of the shaft by means of a lip 48 that is stopped against a shoulder 49 defined between the main portion 26 of the shaft and the reduced portion 28. The other end of the spring 47 is bottomed against a retainer 50 that is prevented from moving axially toward the upstream side of the shaft by means of a pin 51. An overtravel condition of the stack of discs 44 is shown in FIG. 2 in phantom by the parts at the upstream end of the shaft and indicated by 46a.

In order to overcome the pressure differential across the shaft 20, it is necessary to have a force acting against the piston 34 toward the upstream end of the valve. To this extent, a step is provided at the downstream end of the piston 34 to define a pressure differential area 52. Thus, overcoming the pressure differential over the shaft 20 renders the valve of the present invention responsive only to the temperature of the air flow therethrough. Accordingly, the piston 34 is aerodynamically balanced. As seen particularly in FIG. 1, wherein the piston 34 is at its extreme downstream position, the valve never completely closes but always allows a certain air flow therethrough.

It will be understood that modifications and variations may be effected without departing from the scope of the novel concepts of the present invention, but it is understood that this application is to be limited only by the scope of the appended claims.

The invention is hereby claimed as follows:

1. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, a sleeve carried on said shaft and telescopically received within said cylindrical member to coact therewith and with the necked down portion to control fluid flow through said valve, resilient means continually urging said sleeve toward said necked down portion, and temperature actuated means coacting with said cylindrical member and shaft to counterbalance the force of the resilient means and to modulate the position of the sleeve and the fluid flow through the valve in response to the temperature of the fluid.

2. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, a sleeve carried on said shaft and telescopically received within said cylindrical member to coact therewith and with the necked down portion to control fluid flow through said valve, resilient means continually urging said sleeve toward said necked down portion, temperature actuated means coacting with said cylindrical member and shaft to counterbalance the force of the resilient means and to modulate the position of the sleeve and the fluid flow through the valve in response to the temperature of the fluid, and means on said sleeve for overcoming the pressure differential across said shaft to aerodynamically balance the sleeve.

3. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, a sleeve carried on said shaft and telescopically received within said cylindrical member to coact therewith and with the necked down portion to control fluid flow through said valve, resilient means continually urging said sleeve toward said necked down portion, temperature actuated means coacting with said cylindrical member and shaft to counterbalance the force of the resilient means and to modulate the position of the sleeve and the fluid flow through the valve in response to the temperature of the fluid, and means on said shaft associated with said temperature actuated means to permit overtravel thereof when subjected to an excessive temperature.

4. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, a sleeve carried on said shaft and telescopically received within said cylindrical member to coact therewith and with the necked down portion to control fluid flow through said valve, resilient means continually urging said sleeve toward said necked down portion, temperature actuated means coacting with said cylindrical member and shaft to counterbalance the force of the resilient means and to modulate the position of the sleeve and the fluid flow through the valve in response to the temperature of the fluid, and means on said sleeve for overcoming the pressure differential across said shaft to aerodynamically balance the sleeve, said means including an annular step defining a pressure surface facing said outlet.

5. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, an open-ended piston carried on said shaft and intimately fitted to slide within said cylindrical member to coact therewith and with said necked down portion to control fluid flow through said valve, spring means continually biasing said piston toward said necked down portion, and temperature actuated means along said shaft at the upstream side of said cylindrical member coacting therewith and being connected to said shaft to normally counterbalance the force of said spring means and to modulate the position of the piston and fluid flow through the valve in response to the temperature of the fluid.

6. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, an open-ended piston carried on said shaft and intimately fitted to slide within said cylindrical member to coact therewith and with said necked down portion to control fluid flow through said valve, spring means continually biasing said piston toward said necked down portion, temperature actuated means along said shaft at the upstream side of said cylindrical member coacting therewith and being connected to said shaft to normally counter-balance the force of said spring means and to modulate the position of the piston and fluid flow through the valve in response to the temperature of the fluid, and means on said piston for overcoming the pressure differential across the shaft to aerodynamically balance the piston.

7. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, an open-ended piston carried on said shaft and intimately fitted to slide within said cylindrical member to coact therewith and with said necked down portion to control fluid flow through said valve, spring means continually biasing said piston toward said necked down portion, temperature actuated means along said shaft at the upstream side of said cylindrical member coacting therewith and being connected to said shaft to normally counterbalance the force of said spring means and to modulate the position of the piston and fluid flow through the valve in response to the temperature of the fluid, and means permitting overtravel of said temperature actuated means when subjected to an excessive temperature.

8. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindical member having a wall at the upstream end and being open at the downstream end, the downstream end being spaced from the necked down portion, a shaft within the housing mounted in the wall of said cylindrical member coaxially therewith for axial slidable movement relative thereto, means for slidably supporting said shaft adjacent the inlet, an open-ended piston carried on said shaft and intimately fitted to slide within said cylindrical member to coact therewith and with said necked down portion to control fluid flow through said valve, spring means continually biasing said piston toward said necked down portion, and temperature actuated means along said shaft at the upstream side of said cylindrical member coacting therewith and being connected to said shaft to normally counterbalance the force of said spring means and to modulate the position of the piston and fluid flow through the valve in response to the temperature of the fluid.

9. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, an open-ended piston carried on said shaft and intimately fitted to slide within said cylindrical member to coact therewith and with said necked down portion to control fluid flow through said valve, spring means continually biasing said piston toward said necked down portion, a stack of dish-shaped bimetallic discs carried on said shaft and bottomed at the downstream end thereof against the upstream side of said cylindrical member wall, said discs defining a temperature responsive actuator, means secured to said shaft for bottoming said stack at the upstream end thereof, and said actuator normally counterbalancing the force of said spring means and modulating the position of the piston to modulate fluid flow through the valve in response to the temperature of the fluid.

10. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, an open-ended piston carried on said shaft and intimately fitted to slide within said cylindrical member to coact therewith and with said necked down portion to control fluid flow through said valve, spring means continually biasing said piston toward said necked down portion, a stack of dish-shaped bimetallic discs carried on said shaft and bottomed at the downstream end thereof against the upstream side of said cylindrical member wall, said discs defining a temperature responsive actuator, means secured to the shaft for resiliently bottoming said stack at the upstream end thereof to permit overtravel at an excessive low temperature, and said actuator normally counterbalancing the force of said spring means and modulating the position of the piston to modulate fluid flow through the valve in response to the temperature of the fluid.

11. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, an open-ended piston carried on said shaft and intimately fitted to slide within said cylindrical member to coact therewith and with said necked down portion to control fluid flow through said valve, spring means continually biasing said piston toward said necked down portion, a stack of dish-shaped bimetallic discs carried on said shaft and bottomed at the downstream end thereof against the upstream side of said cylindrical member wall, said discs defining a temperature responsive actuator, means secured to the shaft for resiliently bottoming said stack at the upstream end thereof to permit overtravel at an excessive low temperature, said actuator normally counterbalancing the force of said spring means and modulating the position of the piston to modulate fluid flow through the valve in response to the temperature of the fluid, and a step on said piston defining an area differential between upstream and downstream pressure to overcome the pressure differential across the shaft and thereby aerodynamically balance the piston.

12. A temperature actuated fluid flow control valve comprising, a tubular housing having an inlet at one end and an outlet at the other end coaxial with said inlet, an annular necked down portion adjacent the outlet end of the housing, a cylindrical member mounted within said housing coaxial with the inlet and outlet, the outer surface of said member being spaced from the inner surface of said housing to define a fluid flow passage therebetween, said cylindrical member having a wall at the upstream end and being open at the downstream end, the downstream end being spaced from the necked down portion, a shaft within the housing mounted in the wall of said cylindrical member coaxially therewith for axial slidable movement relative thereto, an open-ended piston carried on said shaft and intimately fitted to slide within said cylindrical member to coact therewith and with said necked down portion to control fluid flow through said valve, spring means continually biasing said piston toward said necked down portion, a stack of dish-shaped bimetallic discs carried on said shaft and bottomed at the downstream end thereof against the upstream side of said cylindrical member wall, said discs defining a temperature responsive actuator, means secured to the shaft for resiliently bottoming said stack at the upstream end thereof to permit overtravel at an excessive low temperature, and said actuator normally counterbalancing the force of said spring means and modulating the position of the piston to modulate fluid flow through the valve in response to the temperature of the fluid, said stack of discs decreasing in length along the shaft during an increase in temperature of said fluid flow to allow said spring means to urge the piston toward the necked down portion.

References Cited by the Examiner

UNITED STATES PATENTS

| | | | |
|---|---|---|---|
| 1,639,286 | 8/1927 | Carson | 236—93 X |
| 1,894,842 | 1/1933 | Appelberg | 73—363.1 X |
| 2,199,129 | 4/1940 | Hamilton | 236—12 |
| 2,241,324 | 5/1941 | Selby | 236—99 |
| 3,075,703 | 1/1963 | Freismuth | 236—34 |
| 3,189,277 | 6/1965 | Fox | 236—101 |

FOREIGN PATENTS 1,136,173   9/1962   Germany.

ALDEN D. STEWART, *Primary Examiner.*